United States Patent [19]

Andrada Galan et al.

[11] Patent Number: 5,211,523
[45] Date of Patent: May 18, 1993

[54] ASSEMBLY FOR PROGRAMMED CONTROLLED HANDLING AND TRANSPORTING OF BOXES, CONTAINERS OR THE LIKE

[75] Inventors: Mario Andrada Galan; Fernando Diaz Zorita; Juan Carlos Cristos, all of Madrid, Spain

[73] Assignee: Investronica, S.A., Madrid, Spain

[21] Appl. No.: 648,163

[22] Filed: Jan. 30, 1991

[30] Foreign Application Priority Data

May 22, 1990 [JP] Japan .................................. 2-132427

[51] Int. Cl.⁵ ............................................. B65G 1/06
[52] U.S. Cl. .................................... 414/282; 414/273;
414/280; 414/283; 414/331; 414/277; 414/753;
414/619; 364/478; 180/168; 294/106; 901/1
[58] Field of Search ............... 414/273, 274, 277, 280,
414/281, 282, 283, 222, 225, 226, 618, 619,
744.2, 744.3, 744.6, 744.7, 744.8, 751, 752, 753;
901/1, 31, 38, 46, 47; 294/106, 115; 364/478;
180/167, 168

[56] References Cited

U.S. PATENT DOCUMENTS

| | | | |
|---|---|---|---|
| 3,674,159 | 7/1972 | Lemelson | 414/283 X |
| 3,741,369 | 6/1973 | Schneider | . |
| 3,799,057 | 3/1974 | Cassel | 414/273 X |
| 4,304,433 | 12/1981 | Langowski | 294/106 |
| 4,669,047 | 5/1987 | Chucta | 414/331 X |
| 4,678,390 | 7/1987 | Bonneton et al. | 414/280 X |
| 4,967,130 | 10/1990 | Sorensen et al. | 414/273 X |
| 4,990,841 | 2/1991 | Elder | 180/168 X |

FOREIGN PATENT DOCUMENTS

| | | | |
|---|---|---|---|
| 76238 | 4/1983 | European Pat. Off. | 414/277 |
| 0169156 | 1/1986 | European Pat. Off. | . |
| 0333891 | 9/1989 | European Pat. Off. | . |
| 3614165 | 10/1987 | Fed. Rep. of Germany | . |
| 1272990 | 8/1961 | France | 294/106 |
| 185603 | 8/1987 | Japan | 414/273 |
| 603577 | 4/1978 | U.S.S.R. | 414/744.6 |
| 1204060 | 9/1970 | United Kingdom | 414/281 |
| 2174686 | 11/1986 | United Kingdom | . |

OTHER PUBLICATIONS

European Patent Application No. 91500043.4 Search Report dated Oct. 3, 1991.

*Primary Examiner*—Frank E. Werner
*Attorney, Agent, or Firm*—Kenyon & Kenyon

[57] ABSTRACT

An assembly for the controlled programmed handling of articles includes autoguided and robotized vehicles and a plurality of work stations and storage areas. There is a computer communication system between a host computer, the vehicles, and the work and storage areas. The vehicles have manipulator devices to move articles from the vehicle to the work stations and storage areas and vice versa. The work stations include a receiving area, a work area, and an output area with detector devices for detecting articles in each area and for communicating same to the computer. Each vehicle has a non-traction wheel and an encoder device communicating with the non-traction wheel for converting rotation of the non-traction wheel into distance travelled by the vehicle.

6 Claims, 4 Drawing Sheets

ASSEMBLY FOR PROGRAMMED CONTROLLED HANDLING AND TRANSPORTING OF BOXES, CONTAINERS OR THE LIKE

FIELD OF THE INVENTION

The present invention relates to a system for programmed controlled handling and transporting of boxes, containers or the like.

BACKGROUND OF THE INVENTION

The object of the present invention is to provide for the automatic handling and transporting of boxes, containers or the like. More specifically, the present invention is directed to an apparatus, following the instructions of a host computer, capable of moving containers from one place to another, for example, in a warehouse or workshop.

The present invention is useful in a factory and provides for the automatic transport of the workpiece of a manufacturing process to different work stations at which the manufacturing operations are performed. An external computer communicates with one or several apparatus, e.g., via radio or infrared rays, and with the work stations by any of a variety of means. This permits the control and management in real time of every resource involved in the production process (e.g., machines at work stations, operators, the product itself and its components). It also controls and manages the time in which each resource is involved in each operation of the process. In this way, it is possible to optimize the use of such resources in relation to the requirements of production. Components can also be handled by the same apparatus that will carry them to the manufacturing line straight from their storage place, thus permitting the control and management of the warehouse itself. Similarly, the invention also can be used in final product warehouses, understandably with the condition that the product has to be compatible with the apparatus or with the boxes handled by the apparatus.

There presently exist continuous transport systems with the necessary control means. These prior art transport systems have a great dependency upon the characteristics of the factory for their installation. They are not very flexible with respect to future changes in the factory configuration, and they impose obvious restrictions on the movement of people and/or machines along their installation area. These reasons, among others, have resulted in the use of discontinuous transport means, like autoguided vehicles, as the means of transport.

EP 0 169 156, which corresponds to U.S. Pat. No. 4,678,390, describes an apparatus for handling containers and the articles contained in the containers inside a warehouse. It permits automation of the loading and unloading operations of the articles either at storage points or in the warehouse input and output areas. The feasibility of such a system is based on certain types of marks placed beside every storage position which indicate to the vehicle the actual position of the storage point. Thereafter, the vehicle can make the final positioning with respect to the storage point. Another characteristic of this apparatus and other existing autoguided vehicles with an on board manipulator is either the requirement for specific containers or specific requirement for the basis on which the container or the like must be handled, for instance, the use of guides between containers and their supports.

EPA 0 333 891, which corresponds to U.S. application Ser. No. 07/770,776, now U.S. Pat. No. 5,156,513, is directed to an apparatus for automatically handling clothes on hangers. Although the concept of the vehicle of EPA 0 333 891 is similar to the one of the present invention, the manipulators are specifically directed to very different objects, clothes on hangers.

OBJECTS OF THE INVENTION

It is an object of the present invention to avoid the need of any external marks beside every handling point. It is also an object of the present invention to provide an apparatus to handle commercial containers with the only requirement being that the containers' overall dimensions are within certain limits. The containers may be moved from and to external supports having a more or less horizontal flat surface and whose distance from the vehicle and whose height from the floor are within certain limits.

SUMMARY OF THE INVENTION

The present invention is directed to a method and apparatus to automate the handling of articles such as boxes, containers or products similarly shaped in a work place such as a workshop and/or a warehouse. The present invention provides for the computerized control and management of the workshop or the warehouse or both of them. The apparatus of the present invention includes a manipulator capable of removing a container or the like from an external support and placing it on a container storage area located on the apparatus and to remove a container from this container storage area on the apparatus and place it on an external support. The heights of the container position, either in the container storage area on the apparatus or on the external support can be different with respect to the floor. The external support can be either to the right or to the left of the apparatus.

An autoguided vehicle physically supports the manipulator and provides the ability needed for movement along the floor. The control of the necessary movements, according to the method of the present invention, is provided by electronic devices, including an on board computer. A system of communication with a host computer provides for the exchange of information needed to manage the operations of the apparatus or a set of them. The host computer also communicates with external stations, such as work stations in a workshop or input and output areas in a warehouse, in order to exchange the necessary information to achieve the control of the apparatus, the operators, the machines, and the production. The assembly further includes a manipulator apparatus comprising two columns symmetrically placed and stiffly joined on both sides of the vehicle and a stiff three dimensional frame which can move up and down along the columns. A horizontal extendable arm is vertically hinged to a point on the stiff frame out of the vertical plane formed by the columns in such a way that the arm can rotate around a vertical axis placed in the symmetrical vertical plane of the apparatus, and extend toward both sides of the apparatus without interference with the columns.

A clamp, that can move from one end of a retracted arm to the other end while expanding, removes the articles such as the containers or the like from, or carries them to, an external support or the container storage area on board the apparatus.

DETAILED DESCRIPTION OF PREFERRED EMBODIMENT

Figure 1:
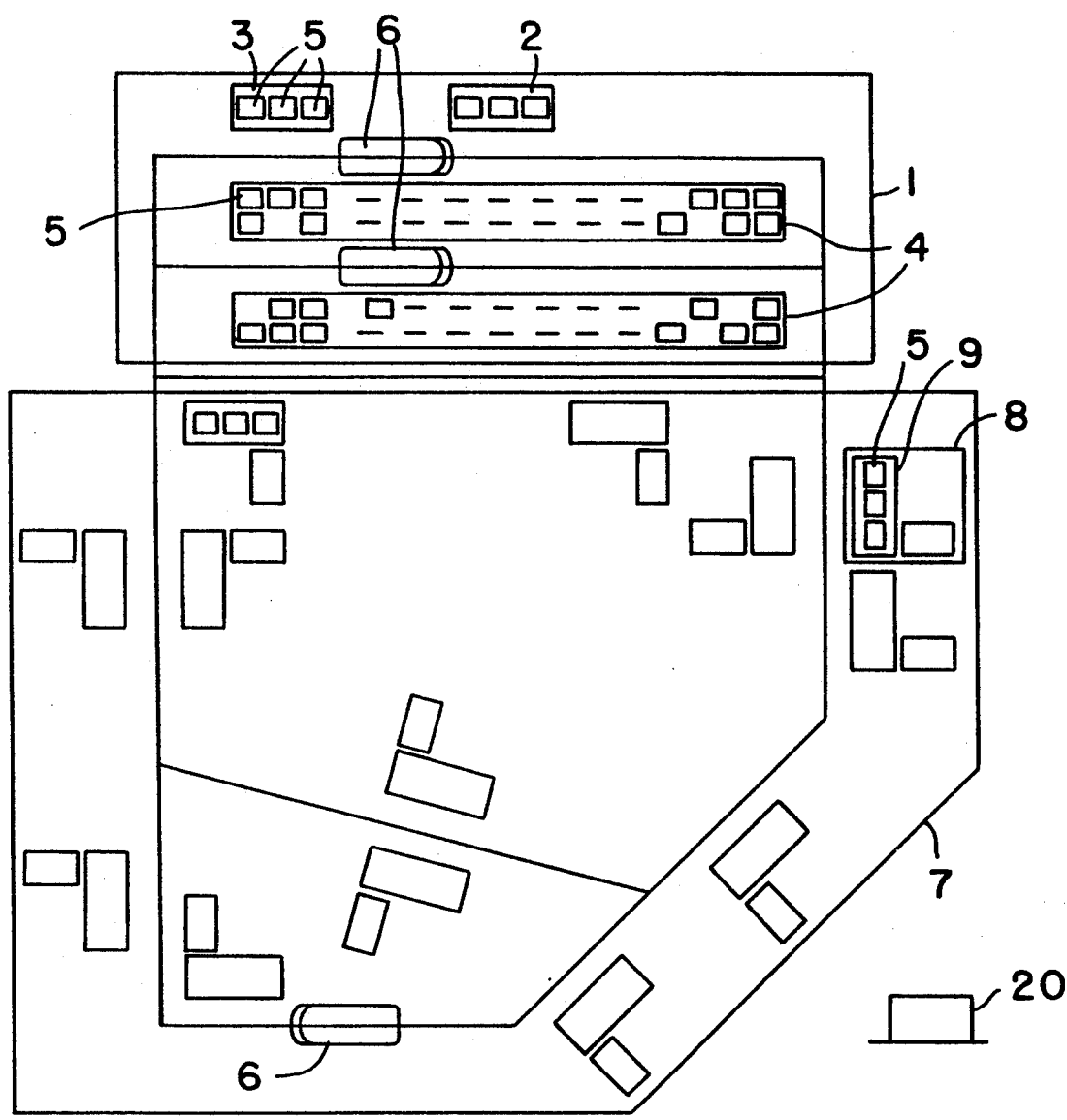
FIG. 1 is a plan view of a computer controlled workshop and warehouse including apparatus in accordance with the present invention.

A preferred embodiment, according to the present invention, is described below with reference to the figures of the drawings. FIG. 1 illustrates the main components that permit the functioning of a storage and manufacturing control system which includes automatic handling and transport by means of autoguided and robotized vehicles.

The storage area 1 includes an input station 2 for components to be stored and an output station 3 where the finished products are carried when required. The components are carried from the input station to the storage racks in containers 5 by the vehicle 6. When the components are required at a manufacturing area 7, the vehicle removes their related containers from the storage area and carries them to the work stations 8 following a programmed route which takes into account the operating sequence of the manufacturing process, the balance of work stations, or the needs of production, among other considerations.

Figure 2:
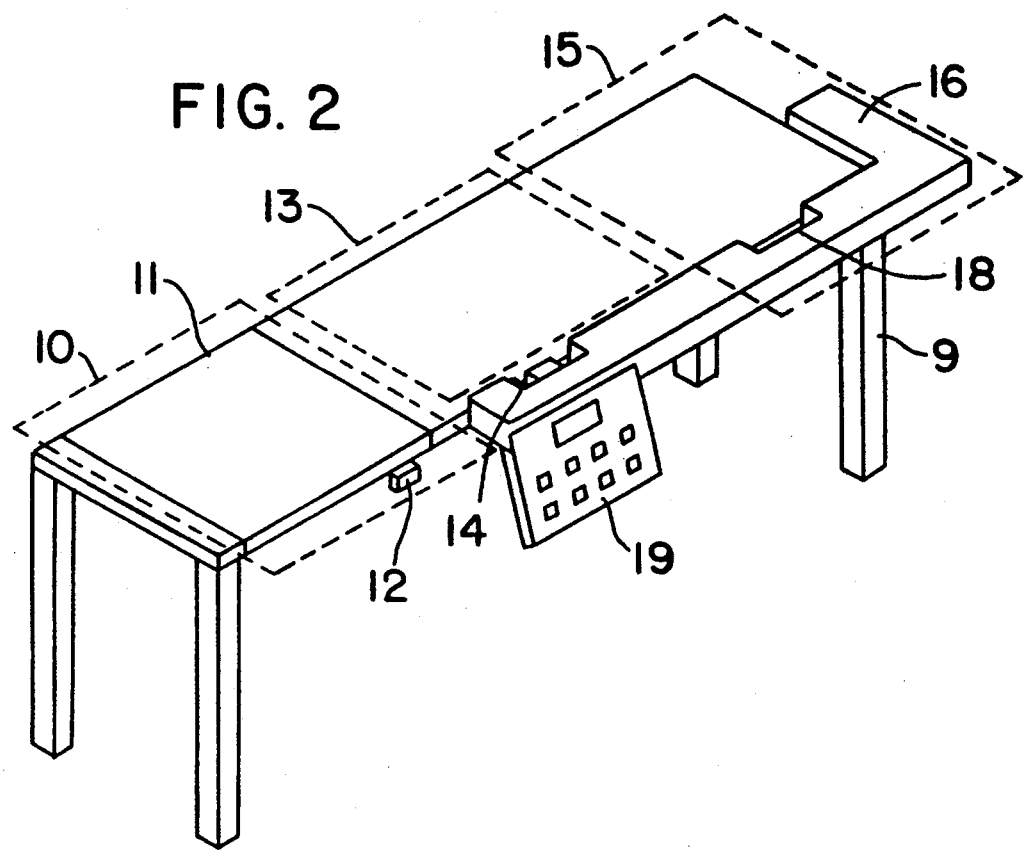
FIG. 2 is a perspective view of a standard work station with its main components in accordance with the present invention.

The work stations 8 include, besides the necessary resources to carry out the required operation, a table 9 to receive the containers, to permit the handling of the containers at the work station, and to permit the containers to be removed by the vehicle. In FIG. 2, it can be seen that the table 9 includes in a container reception area 10, a container presence detector which detects the presence of a container or any other object at any point in this area. This detector may be, for example, a spring plate 11 and a microswitch 12. The work area 13 is where the container stays while the necessary operations with respect to the components are made. After such operations, the components are returned to the container transformed or joined in assemblies. The work area includes another container presence detector such as a microswitch 14. This permits a determination of the time that the container remained in the work area and therefore the related operation time. After the operation is finished, the container is moved to the output area 15 where the device 16 determines the container's correct positioning. The device 16 includes a reader 17 capable of reading a code affixed to the container once the container is placed in front of the reader. All information acquired by the container detectors and reader is gathered by a microterminal 19 which exchanges information with a host computer 20 via a communication system. The microterminal 19 also includes means to permit the exchange of information with an operator. In this way, the host computer can automatically know the status of every container at every work station and exchange information with the operators.

A work station can have more than one reception, work or output area, or can be formed by only reception areas, as the output station 3, or by only output areas, as the input station 2, and so on.

In one embodiment of the present invention, the identification code and reader are specifically conceived for this use and are based on the use of infrared sensors able to detect a dark or bright surface at some distance in front of them. The reader comprises a set of these sensors placed in line. The code comprises a set of bright and dark consecutive areas according to a binary code. The width of such areas are the same as the distance d between two consecutive reader sensors. The code 18 is affixed to the container, see, e.g., FIG. 3, in such a position that when the container is correctly positioned at the work station output area, each code area is in front of the corresponding reader sensor and then a reading can be made. In this way, the sum of the permissible position errors of the code with respect to the container and with respect to the reader would be equal to $\pm d/2$, in the horizontal code direction, and $\pm h/2$ in the vertical direction, with h being the height of the code areas.

Figure 3:
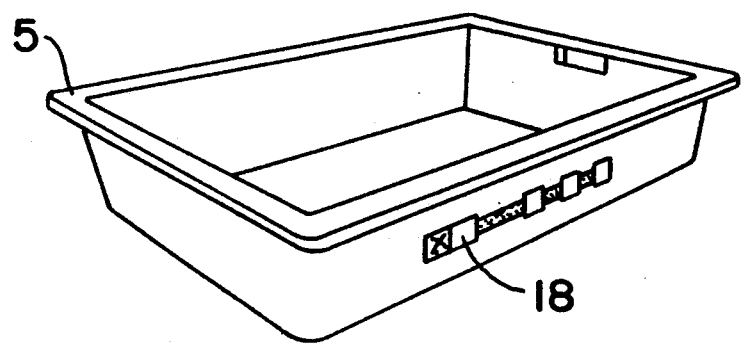
FIG. 3 is a perspective view of a standard commercial container with a code in accordance with the present invention affixed to it.

The preferred code for this embodiment comprises eight dark or bright areas and the corresponding decimal (or octal, as desired) number drawn at a side to visually identify the code. A bright area means 1 (one) and a dark area means 0 (zero), although it can be the contrary. The two areas beside the decimal number are a redundancy code to avoid wrong readings. The remaining six areas are the actual code number. The redundancy code is conceived in such a way as to avoid wrong readings due to a defect on an area, or on two consecutive areas, or due to an external infrared source which can affect the reader, among others. To achieve this, the sum of the binary numbers corresponding to the alternate areas of the full code must result odd. In the example of FIG. 3, the first area, starting on the right, is 1 (one) as are the third and fifth areas. Therefore, the seventh area must be 0 (zero) to sum 3 (three) which is odd. The second, fourth and sixth areas are 0 (zero) and therefore the eighth area must be 1 (one) to also sum odd. The maximum code number will be 64 in decimal, or 77 in the basis eight system, as can be easily calculated. Therefore, by combining two codes, there can be obtained $64 \times 64 = 4096$ different double codes. By combining three codes, we can obtain $4096 \times 64 = 262144$ different triple codes, and so on. Therefore, a number of codes, as big as desired, can be obtained by the combinations of only 64 single codes.

Figure 4:
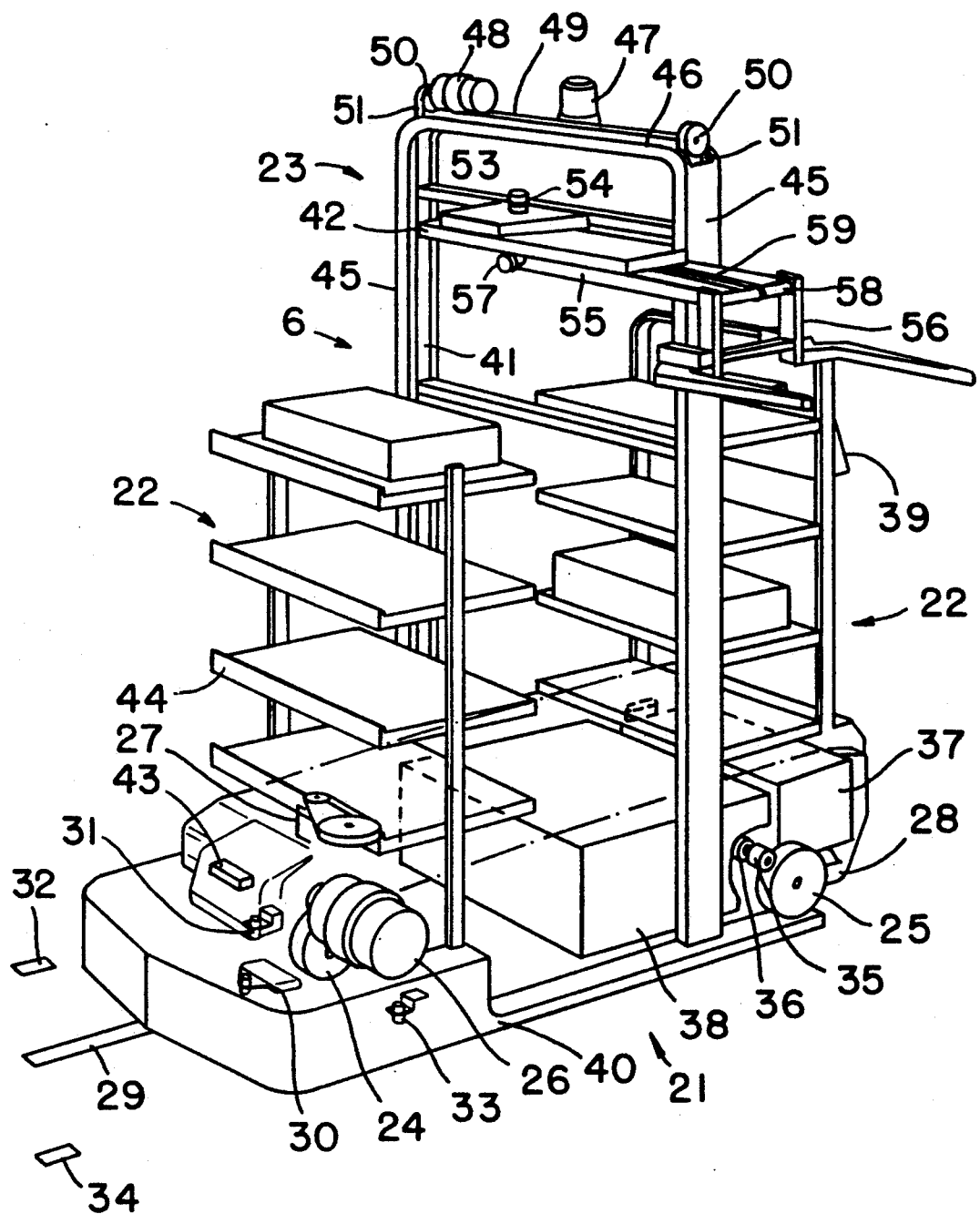
FIG. 4 is a perspective view of an apparatus in accordance with the present invention illustrating the main components of the apparatus and the main accessory elements.

FIG. 4 illustrates the main parts of the apparatus generally designated as 6. Autoguided vehicle 21 supports two container supports 22 and the manipulator 23.

The autoguided vehicle 21 stands on three wheels 24 and 25. Wheel 24 is in the front and the two wheels 25 are in the back. The front wheel 24 provides the traction and driving function using two DC motors 26 and 27 with reducers and encoders and is controlled in position by known electronic devices and the computer on board the vehicle. The traction motor also acts as a brake when the security system is on. The back wheels 25 can also be stopped by a brake device 28 when activated by the security system. The front wheel 24 stands on a metallic strip 29, having appropriate magnetic properties, which is fixed to the floor, for example, with adhesive tape. A sensor 30, placed before the front wheel, detects its relative position with respect to the metallic strip 29 and gives the signals needed for activating the driving motor, thus allowing the alignment of the vehicle with the strip. Sensor 31 detects marks 32 on the floor. Marks 32 are suitably bits of strip, such as strip 29, of a specific length which signal a curve or a side tracking at a distance from the mark.

Another sensor 33, similar to 31, detects other marks 34, similar to marks 32, placed in such a way that they divide the circuit into sectors of determined length.

A friction wheel 35 rests on one of the two back wheels 25 and is connected to an encoder 36 providing a determined number of pulses per turn. The number of pulses, measured by the appropriate electronics, is related to the distance travelled by the wheel 25, and therefore the distance travelled by the vehicle on a straight path. Distances are also measured by the traction wheel, which has the necessary control means as aforementioned. However, the traction wheel can slide during accelerations as the traction loads are transmitted by friction. The horizontal load on the back wheels are much smaller as they only withstand vertical loads. Thus, the possibility of sliding is much smaller for the back wheels. Therefore, the errors in distance measured by the traction wheel 24, due to a possible sliding, can be avoided with the aforementioned assembly.

The sensor 33 and marks 34 can be used to calibrate both the traction motor and the precision of the assembly of wheel 35 and encoder 36, to determine the exact position of the vehicle on the circuit, and also as a support for controlling the traffic, for example, preventing a vehicle from coming into a section where there is another vehicle.

The vehicle communication equipment comprises a wireless transmitter-receiver 47. The on board computer and the electronics for the control of the apparatus are placed in a central module 37. The necessary energy for the functioning of the vehicle is supplied by the batteries 38. The batteries can be automatically recharged.

A microterminal 39 permits operators to initialize the vehicle and to communicate and exchange data with the on board computer. The microterminal includes means to operate the vehicle manually.

The purpose of the security system is to detect external or internal incidences which affect or could affect the working of the apparatus. The security system short circuits the motors when a failure is detected in order to enable the motors to act as brakes and also to operate the brake on the back wheels, and also to inform the host computer of the failure through the communication system. Part of the security system is a flexible strip or foam piece 40 which surrounds the vehicle. When a strain in strip or foam 40 beyond a certain limit is detected by appropriate sensors, the security system is activated. Similar sensors having the same function are located near the end of the actuation range of the driving system and the movable frame 41 and rotating arm 42. The motors are provided with encoders, so they can be controlled in position. This permits operation of the security system when there is a lag of phase between the actual position and the ordered one. The security system also includes a proximity sensor 43 capable of detecting obstacles, for example, via infrared rays or ultrasounds, at some distance in front of the vehicle. The signals from this sensor are processed to stop the vehicle before crashing and continue the movement once the obstacle is removed.

The container support 22 comprises two similar shelves, one located on the back side and the other on the front side of the vehicle. The container supports include trays 44 to support the containers. The free space between the two sets of shelves permits a container to be placed on, or removed from, the corresponding trays by the manipulator 23, which is also located in this free space. The manipulator 23 includes two similar columns 45 stiffly joined at their bottom to the vehicle frame and at their top to one another through a beam 46. The columns have an adequate design to withstand the working loads and to guide the frame 41, which can be moved up and down by a vertical system of movement formed, for example, by motor 48, torque shaft 49, pulleys 50, and toothed belts 51. An extendable and rotary arm 42 is hinged to the frame 41 through a vertical shaft 53 placed on top of the frame 41, in the vertical plane of symmetry of the vehicle and at some distance from the columns to avoid interference with the columns while rotating either with a container or without it. A system of movement formed, for example, by a motor 54, pulleys, and toothed belt can rotate the arm 42 around the vertical shaft 53 in the horizontal plane. The motors 48 and 54 are controlled in position by respective encoders and appropriate electronics. Sensors, such as microswitches, indicate the origin of both vertical and rotary movements.

The arm 42 has an adequate design to withstand the working loads and to guide the movable bar 55 when it slides along it. The movable bar 55 is also designed to allow the clamp assembly 56 to slide along it when acted on by a system of movement formed, for example, by a motor 57 and pulleys 58 fixed to the movable bar 55, and a toothed belt 59 fixed on one side to the arm 42 and by the other to the clamp assembly 56. In this way, when the motor 57 is activated it makes the clamp assembly move with respect to the movable bar at the same time that this moves with respect to only the rotary bar. The movement of the clamp assembly can be controlled by microswitches which detect the retracted position and the positions to place/remove containers on/from the vehicle or from an external support.

Figure 5:
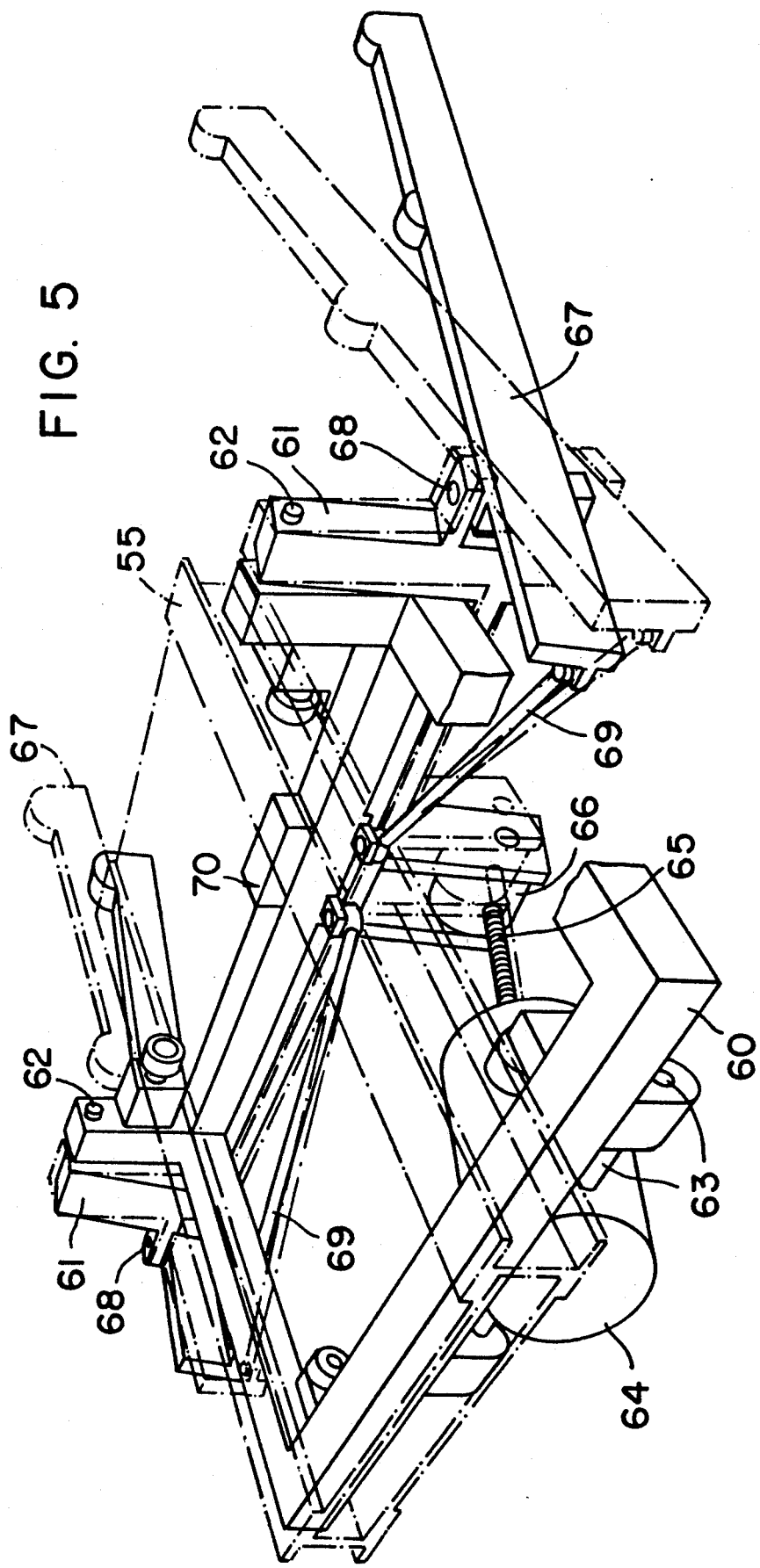
FIG. 5 is a perspective view of a preferred clamp assembly in accordance with the present invention.

FIG. 5 illustrates the clamp assembly 56. The clamp assembly 56 includes a stiff frame 60 which is supported on the guides of bar 55 through low friction pieces, and it supports the tilting frame 61 through the hinges 62 and the bar 63 which is hinged by one end to the stiff frame and by the other to the tilting frame. The bar 63 includes a mechanism which can modify the distance between both hinges, this mechanism comprising, for example, a motor 64 and an endless screw 65 which screws in the nut-piece 66 that is hinged to the tilting frame. When the motor 64 acts, the endless screw rotates in the nut-piece and the tilting frame tilts around the hinges 62. Two members 67 are jointed to the tilting frame through hinges 68 and to the fixed frame by the bars 69 which have rounded joints at both ends. When the tilting frame tilts, the members 67 also tilt with it, but the jointed bars 69 also make them rotate around the hinges 68. In this way, the members 67 can open and lower, or close and lift at the same time, and therefore perform the clamp function if conveniently shaped to adapt to a determined container. The relation between both combined movements can be modified by changing the position and/or length of the jointed bars 69. The open and closed positions can be detected by respective microswitches placed near both ends of the endless screw. The clamp assembly is provided with a sensor 70 to detect if a container has been taken or released when required.

A clamp assembly such as this one permits pick up and release actions without moving other parts in the vertical direction. Therefore the vertical motor 48 will only act when the clamp assembly, with or without container, is in the retracted position so that the vertical loads will be approximately centered over the vertical columns. Therefore, the energy use, and the vehicle autonomy, and the overall stiffness are improved.

With the aforementioned elements and adequate software, the production process can be controlled in a workshop and/or a warehouse where the product can be handled by an apparatus such as the one described herein or the product can be contained in boxes that can be handled by such an apparatus. As an example, the containers start the process, loaded with a set of components, at an input station 2 (see FIG. 1), where every container is identified by the readers. The container number and its content are related by the host computer 20 which communicates with the input station. A vehicle 6 takes the containers from the input station and carries them to the storage area determined by the host computer 20. The containers remain there until they are required at the manufacturing area. When required, the same or another vehicle takes the required containers from their storage area and carries them to work stations 8 assigned by the host computer whose software takes into account the sequence of operations, the balance of work stations, the needs of the production, etc. Each container is placed by the manipulator on a work station reception area 10 where the detector 12 indicates the presence of the container and communicates this through the communication system to the host computer. The host computer will not assign any other container to this work station until the container is removed from the reception area. Once the container is placed on the work area 13 by the operator, the host computer will also know the operation time by means of the container detector 14 which is activated until the container is removed from the work area 13. When the container is placed on the output area 15, it is identified again by the reader 17, and then the operation time and the following operation can be assigned to the right container. The reader also indicates the presence of the container and, it can generate an acoustic or luminous signal to inform the operator if the container is not correctly read so as to relocate it or to review the code or the reader. The host computer will decide when the container has to be removed by a vehicle. The microterminal 19 can exchange any desired information between the operator and the host computer.

Once the operation cycle is finished, the containers are taken from the last work station and carried to the output station 3 or to a storage area where they will remain until required at the output station.

The general lay-out is previously known by the host computer, including the position of every work station and storage point, whose horizontal distance to metallic strip 29, its height with respect to the floor, and its distance, in the direction of the strip 29, to the nearest mark 34, must have been measured.

Once the vehicle receives the order to take a container from a work station or a storage point, it follows a path directed by the host computer. The vehicle communicates to the host computer every mark 32, which signal a curve or a side tracking, and every mark 34, which divide the circuit in sections. In this way, the host computer knows the position of any vehicle at any time and can decide every vehicle path in order to avoid interferences. Every vehicle can follow its corresponding path by counting the marks 32 and 34.

A vehicle is correctly placed in position with respect to a corresponding work station or storage point by the traction motor 26 which is provided with an encoder. The on board computer translates the distance from the last mark 34 in encoder pulses and appropriate electronics control the motor movement. The free wheel 35 and encoder 36 detect possible sliding of the traction wheel and provide the necessary corrections to achieve the final positioning. When the vehicle is positioned, the vertical motor 48 acts to lift the clamp assembly 56 to the required height while the motor 54 rotates the arm 42 in order to place the clamp assembly to the left or to the right of the vehicle according to the position of the container to be taken. The clamps assembly is in the retracted position, with the clamps opened, during both movements. Then the motor 57 acts to move the clamp assembly towards the other end of the bar 55 while this one moves with respect to the bar 42 so as to reach the container position. If the container is detected by the detector 70, then the clamps close, and after the clamp assembly is retracted, the bar 42 is rotated to the rear side or to the front side of the vehicle, depending on the assigned container support tray, while the container is vertically moved up or down to reach the assigned tray position. Then, the clamp assembly is moved again by the motor 57 and the clamps open after the clamp assembly is positioned, releasing the container on the assigned tray. After that, the clamp assembly is retracted again and the rotary bar 42 and frame 41 return to their original position. The container detector 70 can give continuous signals to know if the container has moved out of its correct position in the clamps during the movements. In this way, the on board computer can take steps to avoid further problems and inform the host computer.

The manner of removing a container from a container support and placing it on a work station or in a storage point is similar to the previous description.

We claim:

1. An assembly for programmed, controlled handling of articles in a work place having a floor comprising a host computer, a set of autoguided and robotized vehicles, a plurality of article receiving stations located on the floor of the work place including work stations and storage areas, and a communication system means for communicating between the host computer, the vehicles, and the article receiving stations;
   an external article support means located at each article receiving station, each external article support means having a substantially flat and horizontal article support surface;
   an on board article support means mounted on each vehicle, each on board article support means having a substantially flat and horizontal article support surface, each vehicle having a right and a left lateral side, and each vehicle having mounted thereon an on board computer for communication with the host computer;
   manipulator means mounted on each vehicle for grasping an article positioned on the on board article support means, for transporting the grasped article to an article receiving station adjacent the vehicle, and for releasing the grasped article on the external article support means of the adjacent article receiving station, and vice versa, said article receiving station being adjacent either lateral side of said vehicle, wherein the flat and horizontal article support surface of the article receiving station adjacent the vehicle is at a different height from the floor of the work place than the flat and horizontal article support surface of the on board article support means of the vehicle;

at least one article receiving station being a work station having a receiving area for receiving an article from said manipulator means mounted on the vehicle, first means for communicating with the host computer mounted on said work station and for detecting an article deposited on said receiving area, a work area positioned in said work station adjacent said receiving area, second means for communicating with said host computer mounted on said work station and for detecting an article in the work area, an output area positioned in said work station adjacent said work area, third means for communicating with said host computer mounted on said work station and for detecting an article in the output area, said third means including means for reading an identification code affixed to an article.

2. A system to measure distance travelled by an autoguided vehicle in the assembly according to claim 1 comprising:

at least one non-traction wheel rotatably mounted on said vehicle for rotation on the floor of the work place, said non-traction wheel being rotatable responsive to movement of the vehicle along the floor;

encoder means mounted on said vehicle for communicating with said non-traction wheel for providing electronic pulses responsive to rotation of said non-traction wheel; and means mounted on said vehicle communicating with said encoder means for translating said pulses into distance travelled by said vehicle along said floor.

3. A system to measure distance travelled by an autoguided vehicle in the assembly according to claim 1 comprising:

at least one non-traction wheel rotatably mounted on said vehicle for rotation on the floor of the work place, said non-traction wheel being rotatable responsive to movement of the vehicle along the floor;

a friction wheel rotatably mounted on said vehicle contacting said non-traction wheel, said friction wheel being rotatable responsive to rotation of said non-traction wheel;

encoder means mounted on said vehicle communicating with said friction wheel for providing electronic pulses responsive to rotation of said friction wheel;

means mounted on said vehicle communicating with said encoder means for translating said pulses into distance travelled by said vehicle along said floor.

4. An identification system for articles in the assembly according to claim 1 comprising:

reader means mounted on at least one work station for reading a code affixed to an article, said code comprising bright and dark areas, said reader means including infrared sensor means for identifying said bright and dark areas and means communicating with said sensor means for converting said sensed-bright and dark areas into binary code;

said code including six adjacent areas selectively bright and dark representing a binary number code and said code further including two additional adjacent areas next to said six adjacent areas, said two additional adjacent areas being selectively bright and dark areas and providing a redundancy code;

said code further including an identification area containing visual numerical identification corresponding to the binary number represented by the six adjacent areas;

said redundancy code two adjacent areas being selectively bright and dark to make odd a summation of respective three alternating areas of said six adjacent areas representing the binary number code;

said reading means operating to read said code by said code being present in front of said reading means whereby said reading means detects presence of the article having said code affixed thereon.

5. An autoguided and robotized vehicle for handling and transporting articles, said vehicle having a front end, a rear end, and a frame, said vehicle comprising:

a first set of shelves mounted on the front end of said vehicle and a second set of shelves mounted on the rear end of said vehicle, said first and second set of shelves being spaced apart thereby providing a free space therebetween;

manipulator means mounted on said vehicle and located in said free space between said first and second set of shelves, said manipulator means including:

two spaced apart vertically oriented columns, with each column having a top end and a bottom end, the bottom end of each column being mounted to the vehicle frame, and a beam connected to the top end of each column;

a three dimensional frame movably mounted on said columns for vertical movement along said columns, means for vertically moving said three dimensional frame along said columns;

a rotary arm hinged to said three dimensional frame for rotation about a vertical axis, said hinged rotary arm having a horizontally oriented longitudinal length, means for rotating said rotary arm about said vertical axis;

a horizontally oriented bar having a longitudinal length movably mounted in said rotary arm for longitudinal movement thereon;

a clamp assembly movably mounted on said longitudinally oriented bar for longitudinal movement thereon;

means for causing longitudinal movement of said longitudinal oriented bar and said clamp assembly;

said clamp assembly including means for lifting an article from a support without vertical movement of said three dimensional frame.

6. An autoguided and robotized vehicle according to claim 5 wherein said clamp assembly comprises:

a horizontally oriented stiff three dimensional frame mounted on said horizontally oriented bar;

a tilting frame mounted on said stiff three dimensional frame by two hinges for permitting vertical tilting of said tilting frame with respect to said stiff three dimensional frame;

a tilting bar mounted at a first location to said stiff three dimensional frame and at a second location to said tilting frame, said second location being at a distance from the first location, means for varying the distance between said first location and said second location thereby causing tilting of said tilting frame with respect to said stiff three dimensional frame;

two spaced apart symmetric longitudinal members having a first end, a second end, and an intermediate portion, with the first end of each symmetric longitudinal member being shaped to support the article being handled, each spaced apart symmetric longitudinal member being mounted at its intermediate portion to respective opposite sides of said tilting frame by a vertical hinge, two symmetric elongated bars, each having a first end and a second end, wherein the first end of each elongated bar is connected by a rounded joint to a respective second end of one of said symmetric longitudinal members and the second end of each elongated bar is connected by a rounded joint to said stiff three dimensional frame;

whereby when said tilting frame tilts vertically downward, said spaced apart symmetric longitudinal members tilt vertically downward and move horizontally away from one another, and when said tilting frame tilts vertically upward said spaced apart symmetric longitudinal members tilt vertically upward and move horizontally toward one another.

* * * * *